United States Patent [19]

Rines

[11] Patent Number: 5,613,411
[45] Date of Patent: Mar. 25, 1997

[54] TOOL FOR BREAKING LOOSE LUG NUTS

[76] Inventor: Hubert M. Rines, P.O. Box 237, Yoncalla, Oreg. 97499

[21] Appl. No.: 521,878

[22] Filed: Aug. 31, 1995

[51] Int. Cl.⁶ .................................................. B25B 23/00
[52] U.S. Cl. ............................................ 81/462; 81/177.2
[58] Field of Search .................................. 81/462, 177.2, 81/124.7, 180.1, 52; 248/156, 508, 545

[56] References Cited

U.S. PATENT DOCUMENTS

| | | | |
|---|---|---|---|
| 433,928 | 8/1890 | Bess | 81/52 |
| 3,843,079 | 10/1974 | Reisling | 248/156 |
| 4,620,462 | 11/1986 | Parker | 81/462 |
| 4,625,600 | 12/1986 | Koren et al. | 81/462 |
| 5,018,413 | 5/1991 | Vazquez | 87/462 |
| 5,340,065 | 8/1994 | Thomas | 248/156 |

FOREIGN PATENT DOCUMENTS

| | | | |
|---|---|---|---|
| 2338457 | 2/1975 | Germany | 81/462 |
| 1536907 | 12/1978 | United Kingdom | 81/462 |
| 2241456 | 9/1991 | United Kingdom | 81/462 |

*Primary Examiner*—D. S. Meislin
*Assistant Examiner*—Joni B. Danganan
*Attorney, Agent, or Firm*—James D. Givnan, Jr.

[57] ABSTRACT

A tool for emergency use during changing a tire alongside a roadway includes a socket and extension therefor. An inclined support member urges the socket into lug nug engagement during tool use when downward force is exerted on an arm on the extension. Projections on the support member penetrate a ground surface to prevent slippage of the member.

1 Claim, 1 Drawing Sheet

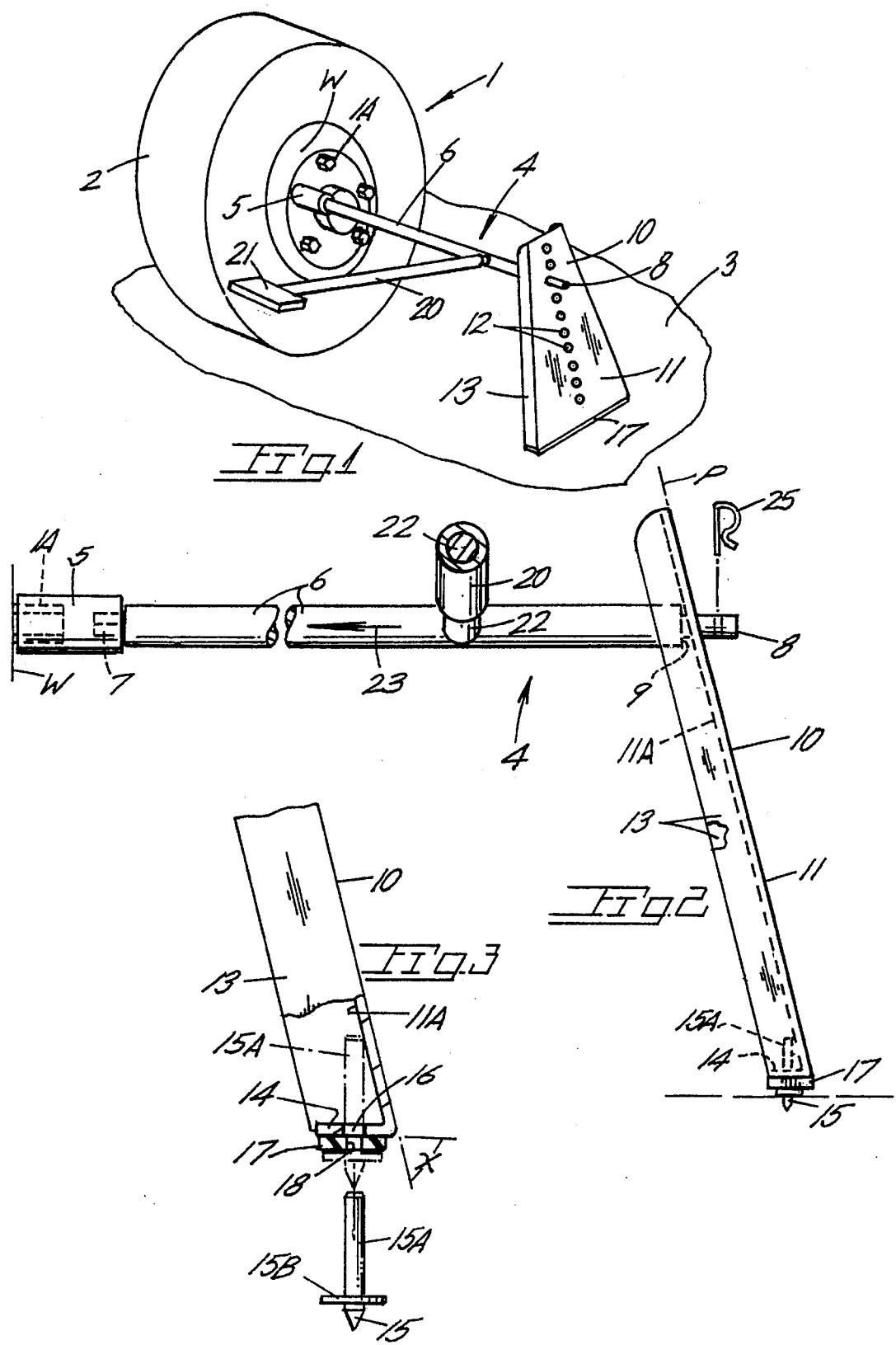

TOOL FOR BREAKING LOOSE LUG NUTS

BACKGROUND OF THE INVENTION

The present invention concerns generally hand tools used during roadside changing of an automobile wheel and tire.

A problem exists in loosening lug nuts which have been overtightened or in place on a wheel a long time. The force required to initially rotate, or break the lug nut loose, can be substantial to the extent it is beyond the capability of certain automobile drivers. In such instances the driver, if alone, is dependent on the aid of a passing motorist or must rely on help summoned from a nearby garage. The problem is complicated when the wrench and/or lug nuts are worn to the extent the wrench tends to cam out of engagement with the lug nut.

The prior art discloses various devices for supporting a lug nut wrench or socket during the application of torque to a lug nut. Examples of such devices are found in U.S. Pat. Nos. 4,620,462; 4,625,600 and 5,018,413. None of the above disclosures are concerned with the problem caused by axially directed forces occurring during slippage of a socket off the lug nut.

SUMMARY OF THE PRESENT INVENTION

The present invention is embodied within a tool for emergency use along a roadway to assist a person in changing a wheel when wheel lug nuts cannot be loosened with a lug nut wrench.

The present invention includes a socket and extension therefor with the extension terminating outwardly in rotatable support with a support member. The extension is provided with an arm for the reception of a downward, physically imparted force, either by hand or the user's foot, to impart initial rotation to the extension and socket. The support member is disposed in an inclined manner resulting in forces imparted to the extension for lug nut rotation also resulting in axially directed forces being imparted to a shoulder on the extension to ensure socket and lug nut engagement during tool use. The support member is provided with a series of vertically spaced apertures to facilitate using of the tool on lug nuts located at different distances above a ground surface. User applied force to the socket extension urges the inclined support member plate in an inward direction toward the lug nut to prevent accidental separation of the tool. The components of the present tool are readily assembled without reliance on other tools or requiring complicated assembly by the user to permit convenient use of the tool even under adverse conditions.

Important objectives of the present invention include the provision of a tool of few components readily assembled by the user to preclude reliance on assistance from a passing motorist or from help summoned from a nearby garage, service station, etc; the provision of a tool permitting substantial torque to be imparted to a rusted or frozen lug nut regardless of physical limitations of the user and without risk of accidental separation of the tool from the lug nut; the provision of a tool for use on various types of ground surface without risk of sudden displacement of tool components to thereby avoid risk of injury to the user.

BRIEF DESCRIPTION OF THE DRAWINGS

In the accompanying drawings:

FIG. 1 is a perspective view of the present tool in use;

FIG. 2 is a front elevational view of the tool shown in FIG. 1;

FIG. 3 is an enlarged fragmentary view of the tool.

DETAILED DESCRIPTION OF THE PREFERRED EMBODIMENTS

With continuing attention to the drawings, the reference numeral 1 indicates generally a wheel assembly, the tire 2 of which is in ground contact with a roadway or road shoulder 3.

Indicated generally at 4 is the present tool disposed for use in initial loosening the lug nuts as at 1A. A wheel is at W. With specific attention to the present tool, a socket at 5 is adapted for engagement with a lug nut 1A. An outwardly disposed or distal end of the socket receives an extension shown at 6 in the form of a shaft in inserted engagement at 7 with the socket. An extension outer end 8 is reduced for inserted engagement with a support member 10 having a plate portion 11. Plate portion 11 is provided with lengthwise extending side flanges 13 and a series of vertically spaced apertures 12. The apertures are of a size to receive the reduced end 8 of extension 6 while a remaining, larger diameter end 9 provides a load receiving surface of extension 6 such as to abut the inner surface 11A of plate 11.

A base 14 of the support member defines an acute included angle X with surface 11A of the plate member for the purposes of positioning the plate member in an upwardly inclined manner with vertically spaced apertures 12 therein offset in an inclined plane P inclined toward the automobile wheel assembly 1. Base 14 may receive spikes or projections at 15 to ensure against slipping of the base tool during use on snow packed or icy surfaces. On dry surfaces a rubber strip 17 on a plate base flange 14, prevents slippage. For retention of the spikes or projections 15 the flange of base 14 is drilled at 16 to receive the spike shank 15A while an opening 18 in rubber strip 17 is undersized to frictionally engage the spike shank. A disk 15B facilitates projection removal.

Extension 6 is equipped with an arm 20 for the purpose of receiving foot or hand applied force on a pad 21 for rotation of the extension and lug nut 1A. The arm is preferably removably mounted on an appendage 22 integral with the extension. Application of a downward force on arm 20 results in the application of torque to socket 5 as well as an inwardly directed, axial force along vector 23 imparted by support member 10 to surface 9 to ensure seated engagement of the extension and socket 5 with a wheel lug nut 1A.

If so desired, the reduced or outer end 8 of the extension may be apertured to receive a retainer such as a hairpin cotter at 25.

The present tool is particularly suited for use by those who otherwise would be stranded alongside a roadway and dependent on assistance. Deployment and use of the tool is virtually self-explanatory to the user. Transfer of the tool, when a new auto is acquired, entails at the most, the purchase of an appropriately sized socket.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A tool for roadside use in breaking loose wheel lug nuts, said tool including, a wrench socket for installation on a wheel lug nut, an extension having first end on said socket and a second end, a load receiving surface on the extension adjacent said second end of the extension, a support member including a plate having a row of apertures for the reception of said second end of the extension and abutment of said load receiving surface with said plate, a base flange adapted for placement on a ground surface, said base flange and said plate defining an acute inclined angle, said plate located transversely of said extension and having side flanges, projections on said base flange of the support member for ground engagement to retain the support member against slippage, said projections insertably engageable with the base flange, a resilient strip in place on said base flange for ground engagement, said strip apertured to frictionally receive said projections, and an arm carried by said extension for the application of force to the extension for rotation of same and the socket thereon for breaking loose a lug nut.

\* \* \* \* \*